(12) United States Patent
Xu et al.

(10) Patent No.: US 9,949,387 B2
(45) Date of Patent: Apr. 17, 2018

(54) DISPLAY FRAME STRUCTURE AND DISPLAY DEVICE

(71) Applicant: Boe Technology Group Co., Ltd., Beijing (CN)

(72) Inventors: Jian Xu, Beijing (CN); Xinyin Wu, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/038,142

(22) PCT Filed: Oct. 19, 2015

(86) PCT No.: PCT/CN2015/092191
§ 371 (c)(1),
(2) Date: May 20, 2016

(87) PCT Pub. No.: WO2016/201836
PCT Pub. Date: Dec. 22, 2016

(65) Prior Publication Data
US 2017/0171997 A1    Jun. 15, 2017

(30) Foreign Application Priority Data
Jun. 15, 2015  (CN) ............... 2015 2 0410568 U

(51) Int. Cl.
*H05K 5/02*         (2006.01)
*H05K 5/00*         (2006.01)

(52) U.S. Cl.
CPC ............ *H05K 5/02* (2013.01); *H05K 5/0017* (2013.01)

(58) Field of Classification Search
CPC combination set(s) only.
See application file for complete search history.

(56) References Cited

U.S. PATENT DOCUMENTS 4,671,417 A * 6/1987 O'Brien ............... A47F 5/0807
                                                              211/59.1
4,705,175 A * 11/1987 Howard ............... A47B 96/00
                                                              108/109
(Continued)

FOREIGN PATENT DOCUMENTS

CN     101592806     12/2009
CN     102998822      3/2013
(Continued)

OTHER PUBLICATIONS

International Search Report and Written Opinion from PCT/CN2015/092191 dated Mar. 3, 2016.

*Primary Examiner* — Lisa Lea Edmonds
(74) *Attorney, Agent, or Firm* — Calfee, Halter & Griswold LLP

(57) ABSTRACT

A display frame structure and a display device belonging to the field of display technology. The structure may alleviate and/or mitigate the problem for the existing display frame structure and display device that the strength will become weak in case of narrow frame design and the active area is reduced. The display frame structure of the embodiment has a side frame formed integrally with the rear housing or detachably connected to the rear housing, the side frame and the plane of the rear housing may form a recess, which may be used for accommodating the display module. The side frame may wrap a side of the display module. Therefore, a fixing structure for this side of the display module is not required, the design for the front frame may be omitted, and a narrow frame design for the display device may be achieved.

12 Claims, 3 Drawing Sheets

(56) References Cited

U.S. PATENT DOCUMENTS

| | | | | |
|---|---|---|---|---|
| 6,813,159 B2* | 11/2004 | Irie | ................. | H05K 5/02 248/917 |
| 7,423,864 B2* | 9/2008 | Kim | ................. | H05K 5/02 313/231.31 |
| 7,598,674 B2* | 10/2009 | Jeong | ................. | H05K 5/02 313/582 |
| 7,864,545 B2* | 1/2011 | Kim | ................. | H05K 5/02 361/679.21 |
| 7,965,039 B2* | 6/2011 | Watanabe | ................. | H04N 5/645 313/582 |
| 8,144,267 B2* | 3/2012 | Kim | ................. | H05K 5/02 348/836 |
| 8,400,763 B2* | 3/2013 | Wang | ................. | G02F 1/133308 361/679.21 |
| 8,418,987 B2* | 4/2013 | Kakuta | ................. | F16M 11/22 248/917 |
| 8,797,729 B2* | 8/2014 | Mukaide | ................. | H04N 5/64 349/58 |
| 2004/0090560 A1* | 5/2004 | Jang | ................. | G02F 1/133308 348/836 |
| 2006/0061945 A1* | 3/2006 | Kim | ................. | H01J 11/10 361/679.24 |
| 2009/0135577 A1* | 5/2009 | Jeong | ................. | H05K 9/0054 361/816 |
| 2010/0320886 A1* | 12/2010 | Sung | ................. | H05K 5/02 312/245 |
| 2011/0317401 A1* | 12/2011 | Ling | ................. | G02B 6/0088 362/97.2 |
| 2012/0241774 A1 | 9/2012 | Chen et al. | | |
| 2014/0049921 A1* | 2/2014 | Tsai | ................. | H05K 7/1401 361/728 |

FOREIGN PATENT DOCUMENTS

| | | |
|---|---|---|
| CN | 203012293 | 6/2013 |
| CN | 204406408 | 6/2015 |
| CN | 204652825 | 9/2015 |

* cited by examiner

Fig. 1    -prior art-

-prior art-

DISPLAY FRAME STRUCTURE AND DISPLAY DEVICE

RELATED APPLICATIONS

The present application is the U.S. national phase entry of PCT/CN2015/092191, with an international filing date of Oct. 19, 2015, which claims the benefit of Chinese Patent Application No. 201520410568.0, filed on Jun. 15, 2015, the entire disclosures of which are incorporated herein by reference.

FIELD OF THE INVENTION

The present invention relates to the field of display technology, particularly to a display frame structure and a display device.

BACKGROUND OF THE INVENTION

As shown in FIG. 1, an existing display frame structure comprises a front frame 2 and a rear housing (not shown in FIG. 1). A display module 1 is embedded between the from frame 2 and the rear housing. The front frame 2 and the rear housing are designed separately, and then they are fixed together by way of engagement.

The front frame 2 has an inner edge 21 and an outer edge 22, a side 12 of the embedded display module 1 is located between the inner edge 21 and the outer edge 22. That is to say, there is a distance L between the inner edge 21 and the outer edge 22 of the front fame 2. In consideration of obtaining a high strength for the side 12 of the display module 1, the distance L is designed to be relatively large. As a result, the periphery of the display module 1 is partly covered by the front frame 2, leading to some of the display areas of the periphery of the display module may be useless, thus the active area of the display may be reduced. Also, in this case, the display may have a rather wide frame, which is not of narrow frame design.

As shown in FIG. 2, the side 12 of the display module 1 comprises a front surface 121 parallel to the display surface of the display module 1 and a side surface 122 perpendicular to the display surface of the display module 1. In case of non-narrow frame design, the front surface 121 is required to be designed to have a width corresponding to the distance L. In addition, the fixation strength of the side surface 122 needs to be considered when the display module 1 has a relatively large display area.

However, at present, a narrow frame is gradually becoming a mainstream design. In case the distance L between the inner edge 21 and the outer edge 22 of the front fame 2 is designed to be smaller (i.e., a narrow frame design), the front frame at the periphery of the display module is rather narrow after the front frame and the rear housing is engaged, hence, the whole strength of the assembled display frame structure is weak, and the display frame structure is easy to be deformed.

SUMMARY OF THE INVENTION

An objective of embodiments of the invention is to alleviate or mitigate a problem for the existing display frame structure and display device that the strength of the display frame structure will become weak in case of narrow frame design and the active area of the display device is reduced a lot due to the large occlusion by the front frame. Therefore, a display frame structure and a display device are provided, so as to improve the strength of the display frame structure, increase the active area of the display device, and achieve a narrow frame design.

According to an embodiment of the invention, the display frame structure provided may comprise a rear housing for accommodating a display module and a side frame that is formed integrally with the rear housing or detachably connected to the rear housing. The side frame may protrude from the rear housing and form a recess together with a plane of the rear housing, and the display module may be arranged at the recess.

In some embodiments, the display module may comprise a back plate facing the rear housing, and the back plate may be fixedly connected to the rear housing.

In some embodiments, the display frame structure may further comprise a strengthening frame, and the strengthening frame may comprise a bottom side and at least one strengthening rib connected with the bottom side. The bottom side may be used for supporting the display module, and the strengthening rib may be connected with the display module.

In some embodiments, the strengthening rib may be fixedly connected with the back plate of the display module.

In some embodiments, the strengthening rib may extend towards a side of the display module opposite to the bottom side of the strengthening frame.

In some embodiments, the strengthening ribs may be arranged at intervals on the bottom side of the strengthening frame.

In some embodiments, the strengthening ribs may be arranged at equal intervals on the bottom side of the strengthening frame.

In some embodiments, the rear housing may further comprise a containing part that protrudes away from the back plate.

Another embodiment of the invention provides a display device, which may comprise the display frame structure described by any one of the above embodiments.

The display frame structure provided by the embodiments of the invention may be provided with a side frame that is formed integrally with the rear housing or detachably connected to the rear housing. The side frame may form a recess together with a plane of the rear housing, and the display module may be arranged at the recess. Such side frame may be used for wrapping a side of the display module, and a fixing structure for this side of the display module is therefore not required. That is to say, the design for the front frame present in the existing display frame structure may be omitted, and a narrow frame design for the display device may be achieved. Meanwhile, the strength of the display frame structure may not be affected, and the active area of the display device can be increased.

DETAILED DESCRIPTION OF THE INVENTION

Next, embodiments of the invention will be described in detail with reference to the figures and specific implementations, so that the technical solutions of the invention can be understood better by a person having an ordinary skill in the art.

Figure 1:
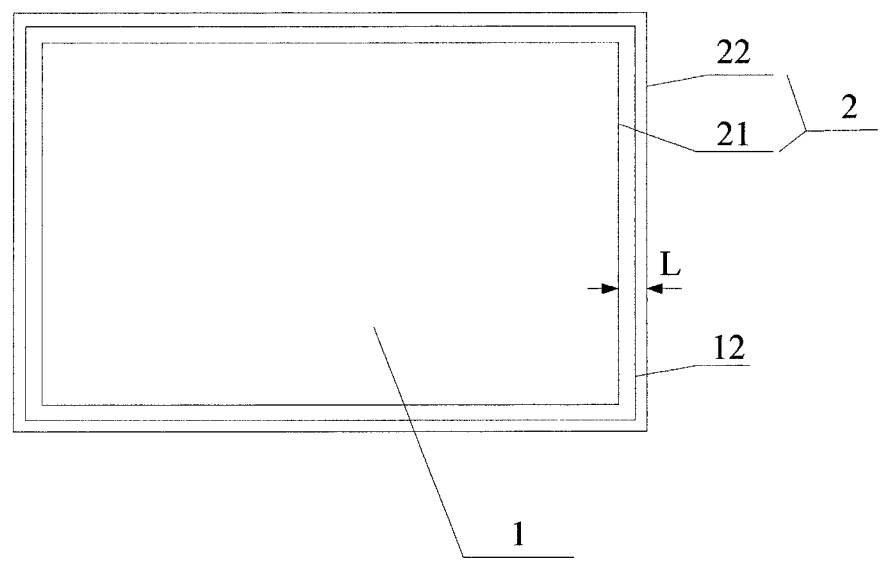
FIG. 1 schematically illustrates a front view of the assembled display frame structure in the prior art.
Figure 2:
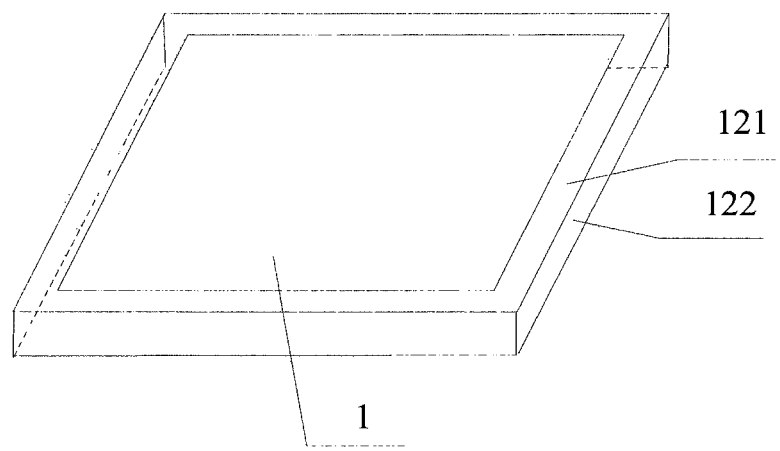
FIG. 2 schematically illustrates a stereogram of the display module in the prior art.
Figure 3:
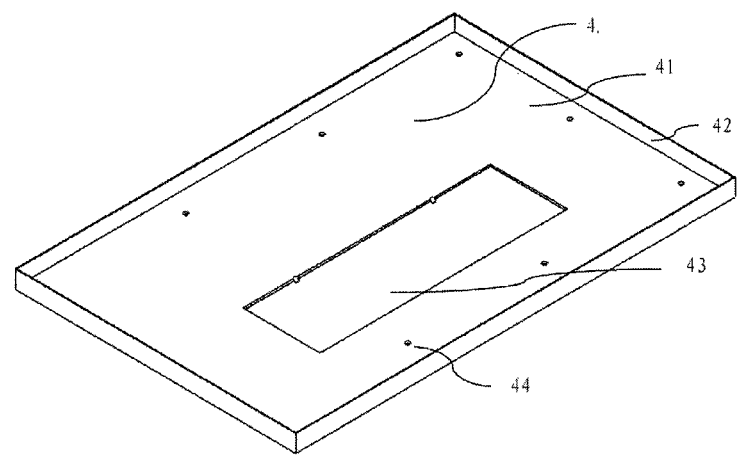
FIG. 3 schematically illustrates a front view of the rear housing of the display frame structure provided by an embodiment of the invention (the rear housing is seen from the display surface to the back).
Figure 4:
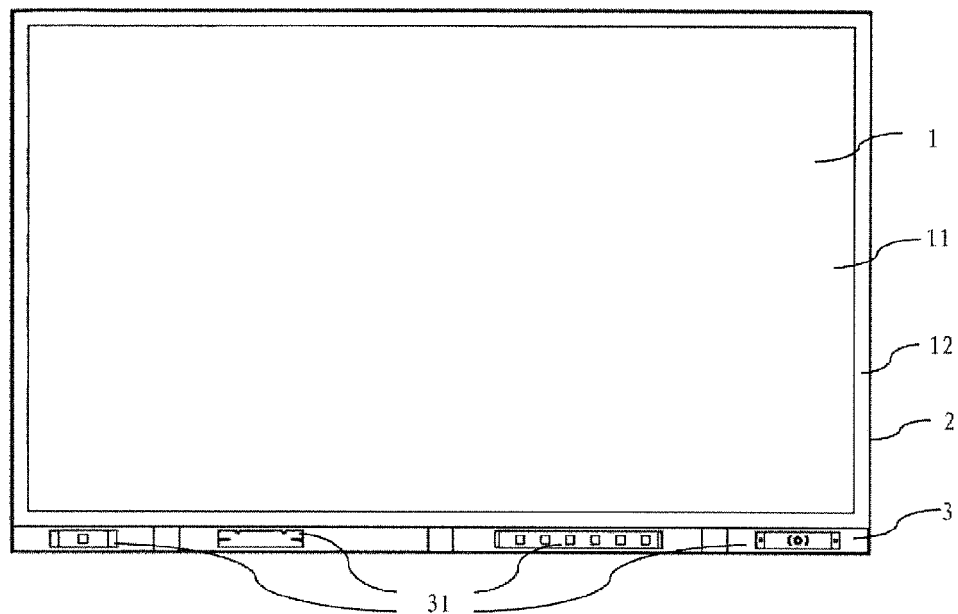
FIG. 4 schematically illustrates a front view of the assembled display frame structure provided by an embodiment of the invention.
Figure 5:
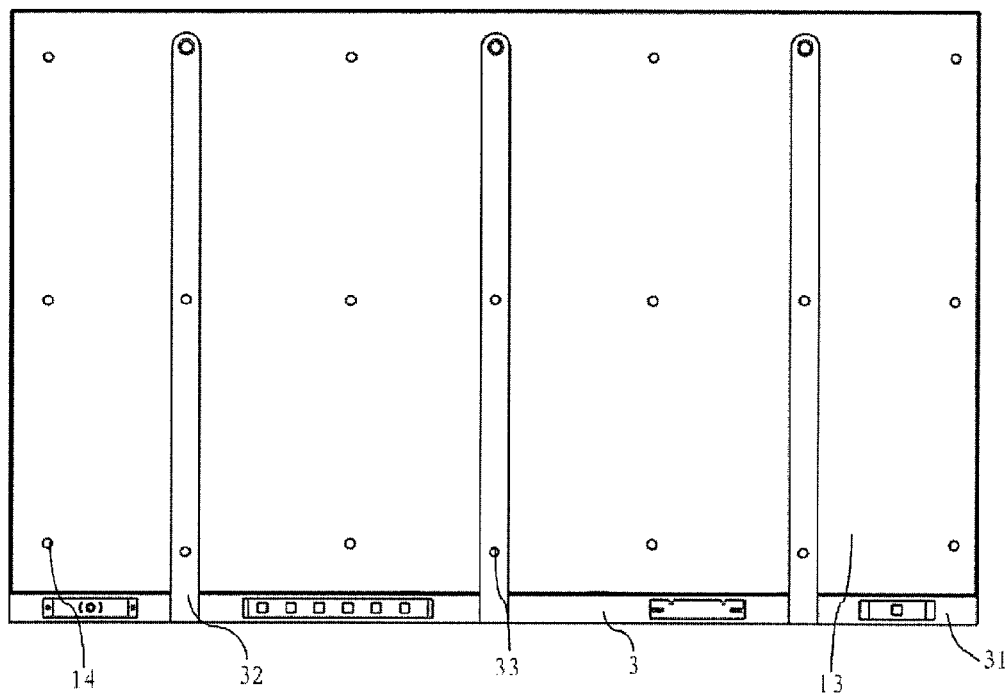
FIG. 5 schematically illustrates a back view of a display module to having the assembled strengthening ribs provided by another embodiment of the invention.

As shown in FIGS. 3-5, a display frame structure is provided by an embodiment of the invention, which may comprise a rear housing 4 for accommodating a display module 1, a side frame 42 that may be formed integrally with the rear housing 4 or detachably connected to the rear housing 4. The side frame 42 may protrude from the rear housing 4 and form a recess 41 together with a plane of the rear housing 4, and the display module 1 may be arranged at the recess 41.

In the embodiment of the invention, the display frame structure is provided with the side frame 42 that may be formed integrally with the rear housing 4 or detachably connected to the rear housing 4, the side frame 42 and the plane of the rear housing 4 may form the recess 41, which may be used for accommodating the display module 1. The side frame 42 may be used for wrapping a side 12 of the display module 1. Therefore, the side frame 42 may cooperate with the rear housing 4 to fix surfaces of the display module 1 other than the front surface of the display module 1, and the display module 1 can be fixed well. In this case, the side 12 of the display module 1 may act as the front frame of the display, in other words, the design of the front frame performed for the existing display frame structure can be omitted, i.e., the additional front frame to fix the display module 1 is not required.

In this way, the side surface 122 of the display module 1 can be covered by the side frame 42 along the periphery of the display module 1, impact force from the rear direction or side direction can be resisted. Moreover, the displaying area of the display module 1 can be made larger, whereas the front surface 121 of the side 12 of the display module 1 may be designed to be narrower, which means that a narrow frame design can be realized. Meanwhile, the strength of the display frame structure may not be affected, and the active area of the display device may be increased.

It should be understood that, the side frame 42 may be formed integrally with the rear housing 4, e.g., they may be manufactured by a process of injection molding. Alternatively, the side frame 42 may be formed separately, and then connected with the rear housing 4 in a detachable way. The connection includes but is not limited to bolted connection, clamping, and so on, which will not be described in detail herein.

In some embodiments, the display module 1 may comprise a back plate 13 facing the rear housing 4, the back plate 13 may be fixedly connected to the rear housing 4. Further, the back plate 13 may contact the rear housing 4 directly to enhance the whole strength of the display module 1.

In another embodiment, the rear housing 4 may further comprise a containing part 43 that protrudes away from the back plate 13, the containing part 43 may be used for containing a circuit board.

In some embodiments, a screw hole 44 for connecting with the display module 1 may be provided within the recess 41.

In another embodiment, in order to enhance the compression strength of the display module 1, the display frame structure may further comprise a strengthening frame 3, as shown in FIGS. 4 and 5. The strengthening frame 3 may comprise a bottom side 31 and at least one strengthening rib 32 connected with the bottom side 31. The bottom side 31 may be used for supporting the display module 1, and the strengthening rib 32 may be connected with the display module 1. In this way, the strength of the display module 1 may be enhanced on the whole by means of the strengthening frame 3.

In addition, the back plate 13 may be provided with a back plate screw hole 14, the back plate screw hole 14 may be fixed with a corresponding screw hole 44 of the rear housing 4 by means of a screw, thereby the display module 1 and the rear housing 4 is fixed together.

The display module 1 may comprise a display panel 11 for displaying at the front side and the back plate 13 at the back side, the strengthening ribs 32 may be fixedly connected with the back plate 13 of the display module 1. For the embodiment of the invention, the "front side" mentioned herein refers to the side of the display module facing a user (i.e., a side of the display module from which the user views the display under normal circumstances), and the mentioned "back side" refers to the side of the display module 1 opposite to the "front side".

As shown in FIG. 5, in some embodiments of the invention, the strengthening rib 32 may be provided with a screw hole 33, and a screw hole may also be arranged at a position of the back plate 13 corresponding to the screw hole 33, then the strengthening frame 3 may be fixedly connected with the display module 1 by means of a screw.

The strengthening rib 32 may extend towards a side of the display module opposite to the bottom side 31 of the strengthening frame 3. As shown in FIG. 5, in case the bottom side 31 of the strengthening frame 3 is arranged under the display module 1, the strengthening ribs 32 will extend towards the upper side of the display module 1. The extension length can be set depending on sizes of different display modules.

In some embodiments, a plurality of strengthening ribs 32 may be arranged at intervals on the bottom side 31 of the strengthening frame 3. Thus, the strengthening ribs 32 may function to enhance the strength of the display module 1 more fully. In other embodiments, the strengthening ribs 32 may be arranged at equal intervals on the bottom side 31 of the strengthening frame 3. In this case, the strengthening ribs 32 may enhance the strength of the display module 1 more fully and uniformly.

With the above display frame structures, a narrow frame design for the display device can be realized, and the front frame can be omitted, which further conforms to the current design trend of the display device. Meanwhile, the strength of the display frame structure will not be affected, and the active area of the display device may be increased.

An embodiment of the invention further provides a display device, which may comprise the display frame structure provided by any of the embodiments stated above. Such display device may be any product or component having a function of displaying, such as a mobile phone, a panel computer, a television, a display, a note book, a digital photo frame, a navigator, etc. Since the display device comprises the display frame structure provided by the above embodiment, embodiments of the display device may have the same technical effect as the display frame structure, which will not be repeated herein.

It can be understood that, the above embodiments are just exemplary implementations for explaining the principle of the invention. However, the scope of the invention is not limited to these embodiments. For a person having an ordinary skill in the art, a variety of variations and modifications can be achieved without departing from the spirit and essence of the invention, such variations and modifications should be covered within the scope of the invention.

The invention claimed is:

1. A display frame structure, comprising:
a rear housing for accommodating a display module,
a side frame that is formed integrally with the rear housing or detachably connected to the rear housing,
wherein the side frame protrudes from the rear housing and forms a recess together with a plane of the rear housing, the display module is arranged at the recess, and the side frame surrounds a side of the display module perpendicular to a display surface thereof,
wherein the display module comprises a back plate facing the rear housing, and the back plate is fixedly connected to the rear housing,
wherein the display frame structure further comprises a strengthening frame, wherein the strengthening frame comprises a bottom side and at least one strengthening rib connected with the bottom side, and wherein the bottom side is used for supporting the display module, the strengthening rib is connected with the display module.

2. The display frame structure according to claim 1, wherein the strengthening rib is fixedly connected with the back plate of the display module.

3. The display frame structure according to claim 1, wherein the strengthening rib extends towards a side of the display module opposite to the bottom side of the strengthening frame.

4. The display frame structure according to claim 1, wherein the strengthening ribs are arranged at intervals on the bottom side of the strengthening frame.

5. The display frame structure according to claim 4, wherein the strengthening ribs are arranged at equal intervals on the bottom side of the strengthening frame.

6. The display frame structure according to claim 1, wherein the rear housing further comprises a containing part that protrudes away from the back plate.

7. A display device comprising a display frame structure, the display frame structure comprising:
a rear housing for accommodating a display module,
a side frame that is formed integrally with the rear housing or detachably connected to the rear housing,
wherein the side frame protrudes from the rear housing and forms a recess together with a plane of the rear housing, the display module is arranged at the recess, and the side frame surrounds a side of the display module perpendicular to a display surface thereof,
wherein the display module comprises a back plate facing the rear housing, and the back plate is fixedly connected to the rear housing,
wherein the display frame structure further comprises a strengthening frame, wherein the strengthening frame comprises a bottom side and at least one strengthening rib connected with the bottom side, and wherein the bottom side is used for supporting the display module, the strengthening rib is connected with the display module.

8. The display device according to claim 7, wherein the strengthening rib is fixedly connected with the back plate of the display module.

9. The display device according to claim 7, wherein the strengthening rib extends towards a side of the display module opposite to the bottom side of the strengthening frame.

10. The display device according to claim 7, wherein the strengthening ribs are arranged at intervals on the bottom side of the strengthening frame.

11. The display device according to claim 10, wherein the strengthening ribs are arranged at equal intervals on the bottom side of the strengthening frame.

12. The display device according to claim 7, wherein the rear housing further comprises a containing part that protrudes away from the back plate.

* * * * *